US012368460B2

(12) United States Patent
Delbeke (10) Patent No.: US 12,368,460 B2
(45) Date of Patent: Jul. 22, 2025

(54) METHOD FOR ESTIMATING PHASE NOISE (71) Applicant: ST ENGINEERING IDIRECT (EUROPE) CY NV, Sint-Niklaas (BE)

(72) Inventor: Philippe Delbeke, Wilrijk (BE)

(73) Assignee: ST ENGINEERING INDIRECT (EUROPE) CY NV, Sint-Niklaas (BE)

( * ) Notice: Subject to any disclaimer, the term of this patent is extended or adjusted under 35 U.S.C. 154(b) by 0 days.

(21) Appl. No.: 18/566,337

(22) PCT Filed: Jul. 13, 2022

(86) PCT No.: PCT/EP2022/069664
§ 371 (c)(1),
(2) Date: Dec. 1, 2023

(87) PCT Pub. No.: WO2023/006432
PCT Pub. Date: Feb. 2, 2023

(65) Prior Publication Data
US 2024/0259038 A1  Aug. 1, 2024

(30) Foreign Application Priority Data
Jul. 29, 2021 (EP) ..................................... 21188458

(51) Int. Cl.
*H04B 1/04* (2006.01)
*H04L 7/00* (2006.01)
*H04L 25/02* (2006.01)

(52) U.S. Cl.
CPC ......... *H04B 1/0475* (2013.01); *H04L 7/0054* (2013.01); *H04L 25/0202* (2013.01)

(58) Field of Classification Search
CPC . H04B 1/0475; H04L 7/0054; H04L 25/0202; H04L 27/266; H04L 27/2657;
(Continued)

(56) References Cited

U.S. PATENT DOCUMENTS 6,246,717 B1 * 6/2001 Chen ........................ H04B 3/46
375/326
7,058,002 B1 6/2006 Kumagai et al.
(Continued)

FOREIGN PATENT DOCUMENTS

EP    2619924 B1    6/2017
EP    3772187 A1    2/2021
(Continued)

OTHER PUBLICATIONS

Extended European Search Report from corresponding EP Application No. 21188458.0, Jan. 24, 2022.
(Continued)

*Primary Examiner* — Emmanuel Bayard
(74) *Attorney, Agent, or Firm* — Workman Nydegger (57) ABSTRACT A method is provided for adjusting at least one transmit parameter of a digital transmitter of a communication system by estimating phase noise of a sequence of symbols received in a demodulator of a digital receiver of the communication system. The method includes: measuring a phase for the symbols of the sequence, deriving a total phase error for the sequence from the measured phases, determining a characteristic of the total phase error, deriving, based on a signal quality estimation of the received sequence of symbols, an indication of a contribution to the characteristic from at least one impairment different from phase noise, obtaining a phase noise estimation by subtracting the indication of the contribution from the characteristic of the total phase error, adjusting the at least one transmit parameter depending on the obtained phase noise estimation.

19 Claims, 6 Drawing Sheets (58) Field of Classification Search
CPC ..... H04L 2027/0024; H04L 2027/0067; H04L 27/0014
USPC ................................. 375/226, 326, 339–340
See application file for complete search history.

(56) References Cited

U.S. PATENT DOCUMENTS

| | | | |
|---|---|---|---|
| 7,126,646 B2 * | 10/2006 | Kim ....................... | H04N 5/455 348/E5.113 |
| 7,342,981 B2 * | 3/2008 | Wongwirawat ....... | H04L 27/066 375/233 |
| 8,831,121 B1 | 9/2014 | Qi et al. | |
| 2002/0176483 A1 * | 11/2002 | Crawford ............ | H04L 27/2657 375/376 |
| 2004/0184522 A1 * | 9/2004 | Kravtsov .......... | H04L 25/03057 375/233 |
| 2007/0086533 A1 * | 4/2007 | Lindh ................. | H04L 27/2679 375/260 |
| 2008/0095226 A1 * | 4/2008 | Bar-Ness ............ | H04L 27/2647 375/233 |
| 2009/0135967 A1 | 5/2009 | Bock | |
| 2014/0211889 A1 * | 7/2014 | Arambepola ......... | H04L 27/265 375/350 |
| 2019/0245569 A1 * | 8/2019 | Shevchenko ........ | H04B 1/1027 |

FOREIGN PATENT DOCUMENTS

| | | |
|---|---|---|
| WO | 2007068407 A1 | 6/2007 |
| WO | 2019048050 A1 | 3/2019 |

OTHER PUBLICATIONS

International Preliminary Report on Patentability for corresponding PCT Application No. PCT/EP2022/069664, Oct. 17, 2023.
International Search Report from corresponding PCT Application No. PCT/EP2022/069664, Nov. 21, 2022.
Rice, F. et al., "Cramer-Rao Lower Bounds for QAM Phase and Frequency Estimation." IEEE Transactions on Communications, vol. 49, No. 9, Sep. 1, 2001, pp. 1582-1591.
Noels, Nele et al., "The True Cramer-Rao Bound for Carrier and Symbol Synchronization." 2002 11th European Signal Processing Conference, Sep. 3-6, 2002, 4 pages.

* cited by examiner

G: Guard Time Symbols
S: Stuffing symbols
H: Header Symbols
D: Data or Payload Symbols
P: Pilot Symbols

METHOD FOR ESTIMATING PHASE NOISE

FIELD OF THE INVENTION

The present invention is generally related to the field of techniques for mitigating the impact of phase noise in a digital communication system. More in particular, the invention relates to techniques for estimating phase noise.

BACKGROUND OF THE INVENTION

The present invention is concerned with measuring phase noise on one or more modulated signals (also called modulated carriers) that have been transmitted over a channel. An example of such a channel is a satellite communication channel.

Phase noise can be introduced into circuits in a variety of ways, especially when frequency synthesizers are used. Crystal oscillators have low levels of phase noise, but synthesizers exhibit more phase noise, especially if they are Phase Locked Loop-based. Due to instabilities and noise inherent to oscillator circuits, the actual phase of the local oscillator signal randomly fluctuates in time around its expected value. This random fluctuation is denoted as phase noise. The phase noise of a free-running oscillator is often modelled as Wiener phase noise. Wiener phase noise has a power spectral density proportional to $|f|^{-2}$. More elaborate models propose a phase noise spectrum S_phi(f) consisting of a sum of terms of the type $A_q |f|^{-q}$ for q=0, . . . , 4, which is a generalization of the Wiener phase noise spectrum.

Phase noise can be characterized by the noise frequency spectrum that is seen spreading out either side of a signal bandwidth in the frequency domain as a result of the phase jitter that exists. The phase noise time domain signal phi(t) is a stochastic process, more specifically, a zero mean phase noise process. This time domain signal has a power spectral density (PSD, expressed in dBc/Hz with respect to the total carrier power). Taking the integral under this PSD one obtains the phase noise power or phase noise variance (which are equal for a zero mean signal). In the following the term phase noise power will be used. This phase noise power often is expressed in radian$^2$ which is accurate for small phase noise powers (as sin(x)~x for small x). The square root of this phase noise variance is the phase noise standard deviation, also referred to as phase noise root-mean square (RMS). The standard deviation and RMS are equivalent for a zero mean phase noise and can be expressed in radian (also accurate for small phase noise powers).

It is well known how to measure phase noise with a spectrum analyzer and to compute, from that measurement, the phase noise power on a transmitter configured to transmit a pure carrier (i.e., the transmitted signal contains only a single frequency, i.e., it is the combination of a sine and cosine on a single frequency). However, pure carrier transmission is typically not possible over a satellite link as it can violate transmit power density regulations. Furthermore, in a system with thousands of user terminals, with components (like e.g. a low noise amplifier) manufactured by a third party, it is not possible to manually measure this per terminal. In addition, it is desirable to be able to compute the amount of phase noise from the actual user signal, without requiring special transmission modes, in order to limit the complexity. Hence, there is a need for a phase noise estimator that does not rely on a spectrum analyzer or a pure carrier transmission.

The working principle of phase tracking at the receiver side of a digital communication system is now briefly revisited. A general demodulator has to estimate the symbol timing and the carrier phase for proper detection of the transmitted symbols. The carrier phase, in this context, is defined as the phase difference between the received symbols, before the phase tracker, and the transmitted symbols. This carrier phase is typically brought close to zero by an initial acquisition (which is not perfect due to noise and other impairments) at the start of the frame, but may then deviate from zero due to a remaining frequency offset and/or phase noise.

Figure 1:
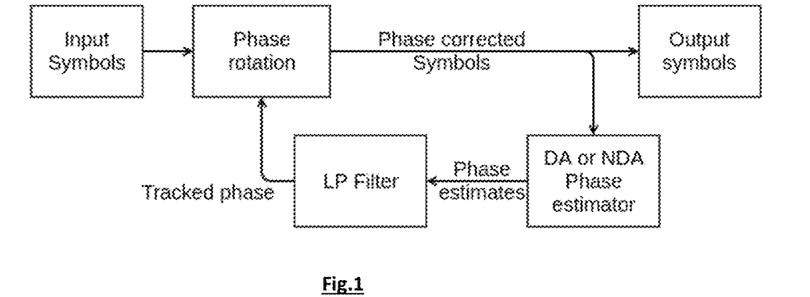
FIG. 1 illustrates a typical implementation of a phase tracker.

The carrier phase is typically the most critical parameter as it can vary faster than the symbol timing. Carrier phase tracking (briefly referred to as phase tracking in the following) is based on an estimation of the phase corrected symbols by a carrier phase estimator (briefly named a phase estimator in what follows). This estimation can be data aided (i.e. based on known symbols) or non-data aided (not based on known symbols, i.e., based on an algorithm that can be used on any transmitted symbol, also data symbols). Non-data aided (NDA) algorithms are based on modulation properties for example. An estimator is typically imperfect. The phase estimator quality defines its self-noise, which is typically characterized by the detector variance or mean square error (MSE). In the case of a phase estimator, this MSE is expressed in squared radians. A phase tracker is typically implemented as a second order loop zeroing residual phase error for a phase error (step input) and frequency error (phase ramp input) as depicted in FIG. 1.

The output of the low-pass (LP) filter is the tracked phase which is then used by a phase rotator to rotate the received symbols with the inverse of this tracked phase to aim for a zero phase-offset between the phase corrected symbols and the transmitted symbols. A second order loop can be configured by a setting its loop bandwidth and damping factor. The loop bandwidth setting is a trade-off between minimizing the detector self-noise (in this case, self-phase noise) and maximizing the capability of tracking of the signal carrier phase and carrier frequency variations. The latter is mainly related to how fast the actual carrier phase can vary, while still allowing its tracking. More specifically, when considering the power spectral density (PSD) of the phase noise, a smaller loop bandwidth (or a large time constant) tracks less high frequency components present in the phase noise PSD. The LP filter performs a sort of averaging whereby the contribution of impairments like additive white Gaussian noise in the phase tracking loop is averaged out.

Phase estimations on the phase corrected symbols obtained from a data aided or non-data aided phase estimator have instantaneous phase variations around the tracked phase with zero average. These estimator variations originate from detector self-noise and carrier phase noise on the received symbols. The goal is to track the actual carrier phase as good as possible. The optimal loop bandwidth setting is a compromise: making the loop slower reduces the detector self-noise but also slows down the tracking and leaves more untracked carrier phase errors.

The estimated average phase noise power is typically based on an estimation of the variance of the tracking phase in the loop. This loop estimates the fraction of phase noise inside the tracked loop bandwidth. The estimated phase noise is thus a statistic of the tracked phase noise. As the tracking bandwidth depends on the symbol rate, the estimated phase noise power is a function of the symbol rate. However, a phase noise power estimation regardless of the symbol rate is more interesting.

It is also disadvantageous that all the phase noise components outside the tracked loop bandwidth are discarded and thus unknown. Note that precisely the higher frequency components of the phase noise, which are not tracked and not estimated in the implementations proposed in the prior art, are most harmful. These are most harmful as the higher phase noise frequency components outside the loop bandwidth, which are not tracked by the phase tracker, cause SNR degradation seen by the decoder.

Hence, there is a need for a phase noise estimator that does not rely on a spectrum analyzer or a pure carrier transmission and that estimates the entire phase noise, including higher frequency components outside the tracked loop bandwidth. In other words, this would allow "observing" all phase noise components, also the higher frequency components that are "untracked" by the phase tracker. As a consequence, those higher frequency components can then be detected before their power becomes so significant that they harm the QEF (Quasi Error Free) performance of the waveform. Having a good estimate of the entire phase noise would also allow taking mitigation measures to avoid the phase noise to be a dominant factor that substantially degrades performance.

US2009/135967 A1 discloses a method for deciding a symbol upon reception of an input signal using received symbols coupled with a quadrature signal pair, wherein phase noise and Gaussian noise are superimposed on at least one such received symbol. When determining or estimating the phase noise and the Gaussian noise for at least one such received symbol, distinction is made between these two types of noise and this is exploited for controlling reception parameters for decisions concerning subsequently received symbols. Differentiation between phase noise and Gaussian noise is made based on constellation related receiver metrics such as magnitude and phase error with respect to a reference constellation. These measurements allow detecting high phase noise power levels that cause a QEF threshold degradation. The demapper is adjusted to be robust against such levels. The measured values of the phase noise are orthogonalized to the Gaussian noise.

In U.S. Pat. No. 7,058,002 B1 an OFDM packet communication receiver is presented wherein the deterioration of received signal quality is suppressed, even when a carrier frequency error and/or a clock frequency error exists between a transmitter and a receiver, and/or phase noise and/or thermal noise is superimposed to a received signal in a receiver.

WO2007/068407 A1 suggests optimizing the receiver by switching from coherent to non-coherent or semi-coherent detection in case of severe phase noise. Although this results in better performance of the demodulator in conditions where phase noise impacts the performance, this is not a preferred solution as phase noise contributions will still degrade QEF performance for a given SNR condition.

Prior art does not explain how a phase noise estimator that takes into account higher frequency components outside the tracked loop bandwidth and that operates under conditions where the thermal noise is significantly higher than the phase noise, can be achieved. Higher frequency components of the phase noise get averaged out when averaging out the thermal noise (also known as AWGN noise).

SUMMARY OF THE INVENTION

It is an object of embodiments of the present invention to provide for a technique for adjusting at least one transmit parameter of a digital transmitter of a communication system by estimating phase noise wherein higher frequency components are taken into account.

The above objective is accomplished by the solution according to the present invention.

In a first aspect the invention relates to a method for adjusting at least one transmit parameter of a digital transmitter of a communication system by estimating phase noise of a sequence of symbols received in a demodulator of a digital receiver of said communication system. The method comprises:
  measuring a phase for the symbols of the sequence,
  deriving a total phase error for the sequence from the measured phases,
  determining a characteristic of the total phase error,
  deriving, based on a signal quality estimation of the received sequence of symbols, an indication of a contribution to the characteristic from at least one impairment different from phase noise,
  obtaining a phase noise estimation by subtracting the indication of the contribution from the characteristic of the total phase error.
  adjusting the at least one transmit parameter depending on the obtained phase noise estimation.

With the present invention a solution is proposed where phase noise can be measured and enough pilot resources can be added at the transmit side so that the phase noise can be tracked and it is always ensured coherent detection is possible. The proposed solution indeed allows for appropriately estimating phase noise as an indication of a contribution of other impairments is determined and subsequently deducted from the total phase error characteristic, e.g. the total phase noise power. Detection of the phase noise level even when below the AWGN noise and before there is any receiver performance impact allows optimizing the transmitter waveform and operating the demodulator in optimal coherent mode. The invention capitalizes on the fact that most impairments can be approximated as additive and Gaussian distributed impairments.

In preferred embodiments adjusting the at least one transmit parameter depends on a comparison of the obtained phase noise estimation with a reference phase noise value.

Advantageously adjusting the at least one transmit parameter results from an algorithm wherein a plurality of receiver metrics is combined.

Preferably the step of adjusting comprises increasing the symbol rate of the sequence of symbols if the obtained phase noise estimation exceeds the reference phase noise value.

In other preferred embodiments the method comprises a step of changing the sequence of symbols at the digital transmitter side if the obtained phase noise estimation exceeds the reference phase noise value.

In some embodiments the step of adjusting comprises changing a time and frequency resource elements allocation on an OFDM grid. In other embodiments the step of adjusting comprises changing a density or a distribution of phase tracking reference symbols on an OFDM grid. In yet other embodiments the step of adjusting comprises changing the PTRS time or frequency densities on a 5G-NR channel. Note that this is not limited to a specific flavour of 5G-NR, as the skilled person will readily recognize.

In some embodiments the indication of the contribution to the characteristic is computed using a predetermined function. The predetermined function may be a lower bound for the variance of the received sequence of symbols. The lower bound may in preferred embodiments be a Cramér-Rao bound.

In other embodiments the predetermined function corresponds to using tables of values obtained from simulations.

In some embodiments the signal quality estimation is a receiver signal to noise ratio estimation.

Preferably the receiver is a coherent receiver.

In some embodiments the digital transmitter is arranged to modulate the sequence of symbols according to the 5G-NR standard. In other embodiments another 3GPP specification is applied.

In one embodiment the demodulator is a multi-carrier demodulator. In another embodiment the demodulator is arranged for demodulating a single carrier signal only.

In one aspect the invention relates to a receiver device of a communication system. The receiver device comprises a demodulator arranged for performing the method as previously described.

In one aspect the invention relates to a receiver device of a communication system. The receiver device comprises a demodulator arranged for performing a method for estimating phase noise of a sequence of symbols received in a demodulator of a digital receiver, wherein the method comprises:
  measuring a phase for the symbols of the sequence,
  deriving a total phase error for said sequence from the measured phases,
  determining a characteristic of the total phase error,
  deriving, based on a signal quality estimation of the received sequence of symbols, an indication of a contribution to the characteristic from at least one impairment different from phase noise,
  obtaining a phase noise estimation by subtracting the indication of the contribution from the characteristic of the total phase error.

In an advantageous embodiment the receiver is arranged to perform a comparison of the obtained phase noise estimation with a reference phase noise value.

In preferred embodiments the indication of the contribution to the characteristic is computed using a predetermined function.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The presence of phase noise can result in a detection error at the receiver side. This can be solved by phase noise mitigation techniques such as selecting larger symbol rates (resulting in larger useful signal powers reducing the impact of a given phase noise power) or by providing a sufficient number of pilot symbols (which are known symbols, not containing any data) which are also sufficiently regular to better track the actual carrier phase. Phase noise mitigation techniques, however, inevitably come with a lower efficiency (e.g. due to an increased number of known symbols in the waveform). It is thus paramount to know how much phase noise is present in a received signal to be able to apply the right amount of overhead or the right symbol rate. Hence, there is a need for an accurate phase noise estimator, for example a phase noise power estimator (or equivalently, a phase noise standard deviation or RMS estimator). In this description a phase noise power estimator is referred to, but the reader skilled in the art readily understands this power estimator is equivalent to an estimator based on the estimation of other phase noise statistics to apply an efficient amount of phase noise mitigation.

Figure 2:
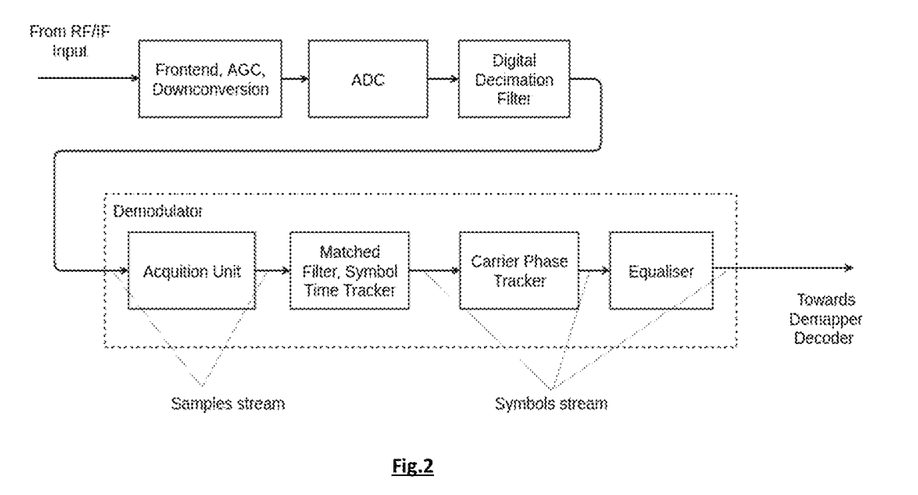
FIG. 2 illustrates a block scheme of a typical demodulator structure.

FIG. 2 represents a high level block scheme of a digital receiver and its parts relevant for the present invention. A front-end circuit converts the incoming waveform, i.e. the received signal, to a sequence of digital samples at a baseband frequency. Next, the waveform of interest is sampled and further digitally filtered and decimated. A version of the received signal is so obtained. FIG. 2 also shows a demodulator structure comprising an acquisition unit, a matched filter, a phase tracker and an equalizer. These components will be discussed with more detail later in this description. The person skilled in the art immediately recognizes that the position of the phase tracker in the chain is not critical and can be changed compared to the position shown in FIG. 2.

The received signal may be a continuous or a non-continuous waveform. Both continuous and non-continuous waveforms can be composed of known symbols (preamble or pilot symbols) for synchronization and identification, and payload data symbols containing payload information.

The method of the present invention is applicable to any communication link with a variety of impairments, such as Doppler effects (e.g. due to velocity and acceleration of transmitter, relay and/or receiver) causing frequency offsets and symbol rate variations, such as fading (causing variations in level and SNR), such as delay variations, as well as linear distortions (e.g. due to slopes, multipath effects, imperfect filtering, imperfect time alignment, imperfect adjacent carrier rejection) and non-linear distortions (e.g. due to non-linear amplifications).

All impairments require specific measures in the demodulator chain. The automatic gain control (AGC) follows level variations of the incoming signal. The initial acquisition estimates and compensates for an initial frequency offset, initial phase offset, level offset, and timing offset. The header of the transmitted burst is dimensioned to deal with these impairments in an appropriate way. As a consequence, the remaining impairments can be tracked. Linear distortions are typically compensated for in the equalizer. Prior to the equalizer, the linear distortions typically follow a distribution that is close to a Gaussian distribution, definitely for APSK signalling (such as QPSK, 8PSK, 16APSK, 32APSK, 64APSK), but also in first order for any other zero mean constellation. These imperfections cause a loss that can be seen as additional AGWN noise. In an appropriately working system, dominant non-linear distortions are avoided, e.g. by an automatic uplink power control function keeping the carrier to non-linear distortion power ratio well above the carrier-to-noise ratio, such that the noise is dominant over the non-linear distortions, or by calibrating the amplifiers in the chain in order to limit the input power to those amplifiers such that the non-linear distortions are sufficiently below the noise.

In the invention the I/Q symbols obtained after the matched filter are considered, when synchronization has finished. Hence, the sampling time offset and frequency offset are corrected for after the acquisition stage.

The method of the present invention can be implemented in a single demodulator device which only demodulates a single carrier corresponding to a point-to-point link, as well as in a multi-carrier demodulator (MCD) device, which demodulates multiple parallel carriers, e.g. by performing a parallel-to-serial conversion after a channelizer (not shown in FIG. 2). Signal channelization is well known and extensively addressed in the prior art, e.g. in U.S. Pat. No. 8,831,121B. The channelizer downsamples and serializes slices of a receive signal at the ADC sample rate into a plurality of sample segments corresponding to parts of carriers or bursts at a suitable oversampling rate (samples/symbol) for subsequent demodulation and decoding effort. The MCD applies for example to MF-TDMA transmission in the return link of a satellite communication system, where a plurality of terminals communicate with a single gateway. The demodulator after the channelizer can demodulate burst after burst or perform time-multiplexed demodulation (as explained in EP3772187A1). Alternatively, the multi-carrier demodulator may for example simply comprise of multiple parallel demodulators, each tracking a particular carrier, e.g. as set out in EP2619924B1.

Regardless of the type of demodulator, the demodulator structure is arranged to perform synchronization on a carrier, for example based on known symbols inside the burst (such as the header and pilot symbols). The synchronization is typically performed by an acquisition unit, matched filter, a phase tracker and equalizer, all illustrated in the implementation of a demodulation structure shown in FIG. 2. The frequency offset, channel gain (level and phase) and sampling time offset are estimated by the acquisition unit on the header inside the preamble and further fine-tracked by a matched filter and phase tracker over the entire burst. By implementing a signal quality estimator one can optionally also estimate one of the signal-to-noise ratio, signal-to-distortion ratio, fading on uplink and downlink, etc. Also a phase noise estimation is interesting. Phase noise estimation, even when phase noise is below the thermal noise, allows adapting the transmit waveform (e.g. by adding pilot symbols or increasing the symbol rate) before phase noise has an impact on reception quality. Limiting the phase noise impact allows coherent reception which is in—that case always outperforming non-coherent reception.

Estimated parameters such as time offsets, frequency offsets and/or signal-to-noise ratio monitoring and so on, can for example be used by a central controller device, e.g. forming part of a satellite communication system, to signal adjusted transmit parameters, such as an adjusted start time of transmission, adjusted centre frequency, adjusted modulation and coding, another power and symbol rate, a particular known symbol composition (i.e. length of the header, location and number of pilot symbols included in the burst) in order to maximize the transmission efficiency.

Figure 3:
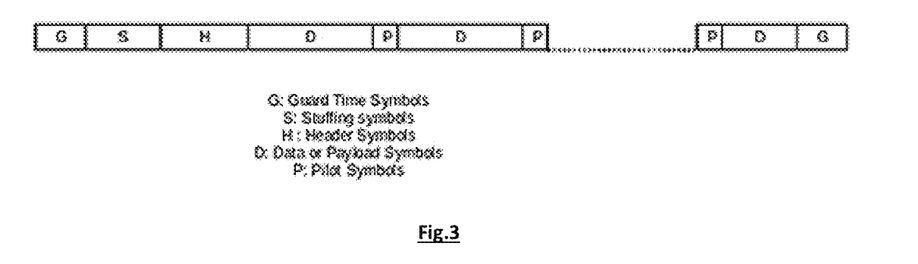
FIG. 3 illustrates a possible known symbol composition.

Such a known symbol composition can for example contain the elements depicted in FIG. 3. Obviously, this is merely an example and a signal composition that can be used in embodiments of the invention is not limited hereto.

Start Guard Time Symbols (to account for timing uncertainty)
Header (also called a preamble) for initial acquisition (initial timing, phase, level, and frequency offset estimation)
Payload Data symbols
Pilot Symbols, ordered in pilot groups
End Guard Time
Optional stuffing for block-up converter (BUC) power ramp-up (a transient absorbing section whereby transients can be terminal BUC frequency transients due to sudden change in drive power applied by the indoor unit, or terminal indoor unit synthesizer reconfiguration transients). The transient absorbing section has a fixed duration $T_{transient}$. It is possible to conceive a terminal architecture allowing $T_{transient}$ to be near-zero.

Alternatively, the waveform is an OFDM waveform like in the 5G-NR specification. Similarly, phase tracking can be achieved via known pilot segments (such as phase tracking reference symbols (PTRS symbols)). The time domain density of the phase tracking reference symbols can be optimised in function of the estimated phase noise according to this invention. The phase noise estimation concepts described hereafter thus also apply to OFDM waveforms, such as the 5G-NR waveform.

Figure 4A:
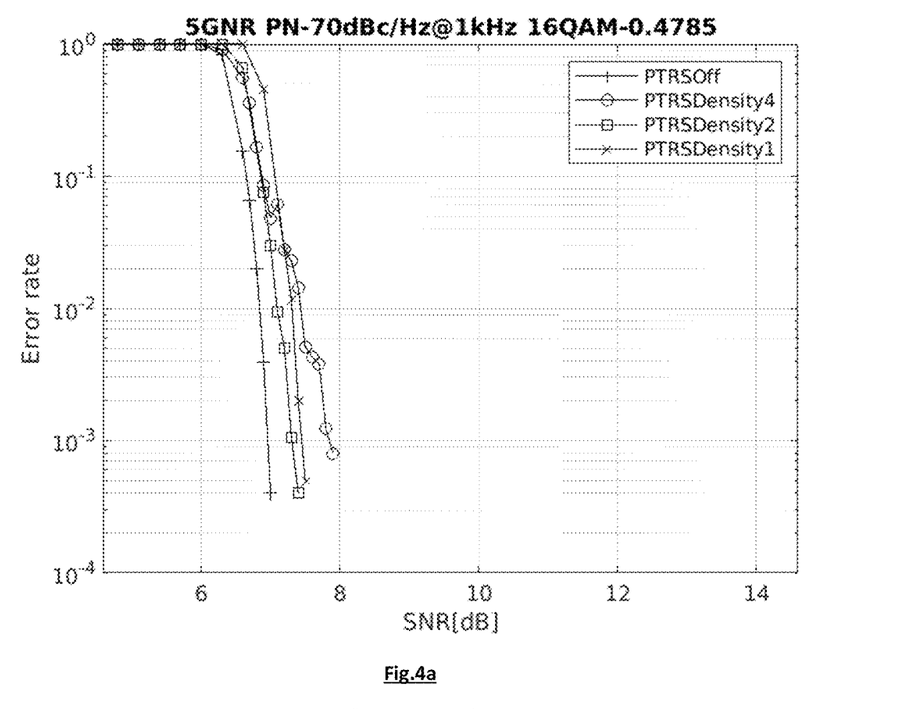
FIGS. 4a, 4b and 4c show simulated 5GNR FER (frame error rate) curves for different phase noise levels with profile $1/f^2$ and PTRS density settings for a 16QAM OFDM burst.
Figure 4B:
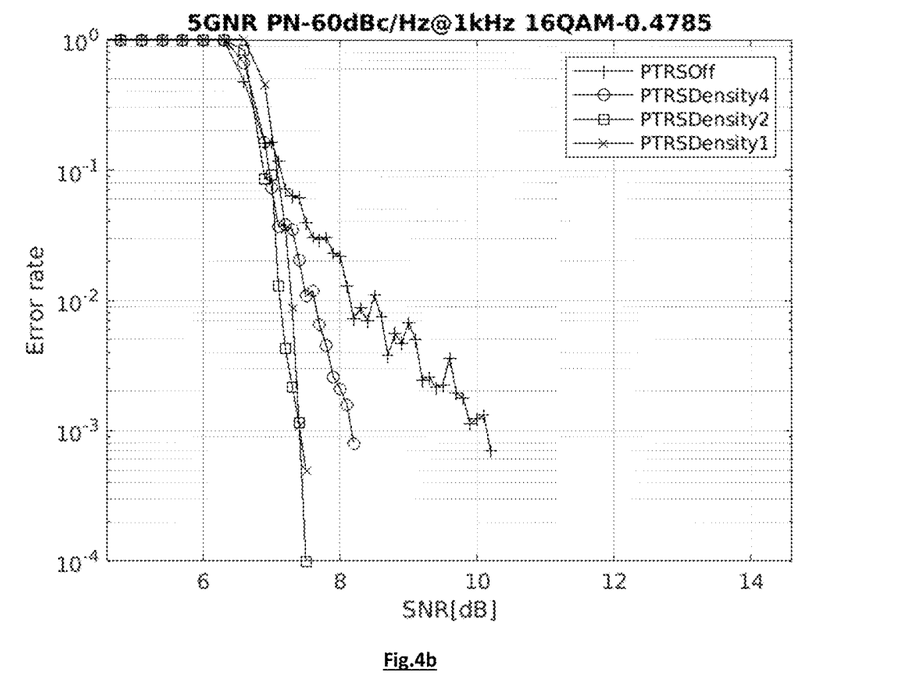
Figure 4C:
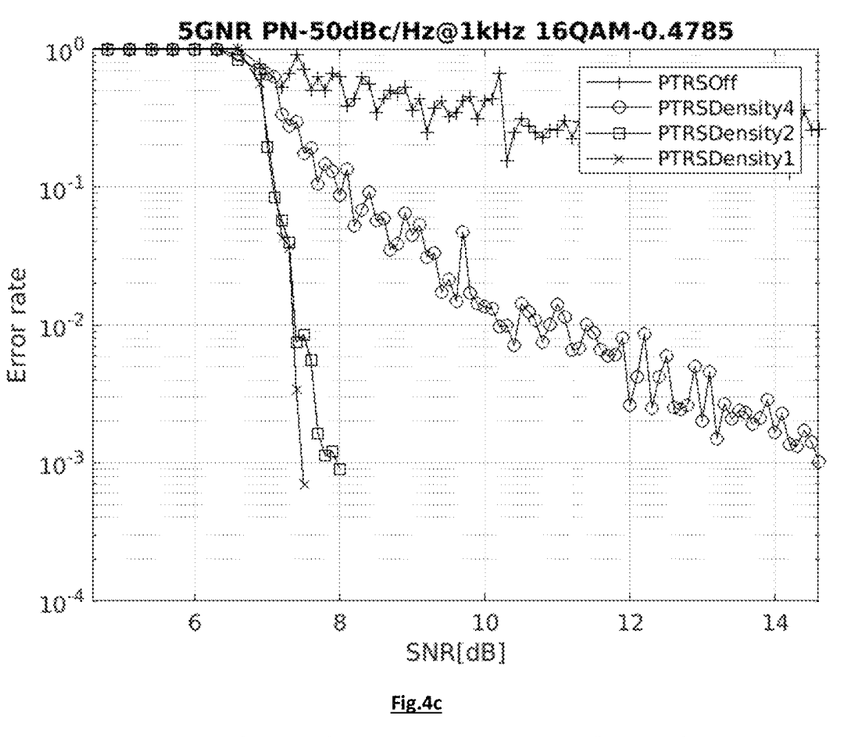
Figure 5:
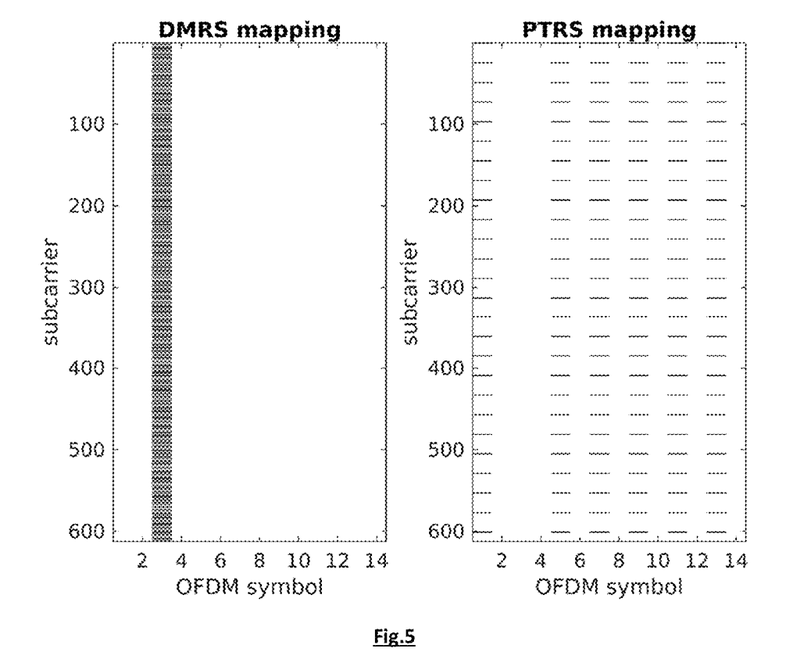
FIG. 5 illustrates a possible 5GNR DMRS and PTRS mapping.

As an example, some simulated 5G-NR OFDM reception performance FEC FER (frame error rate) curves are given for different phase noise conditions and PTRS symbol distributions in FIGS. 4a/b/c. The simulated phase noise profiles are $1/f^2$ phase noise profiles with level of −70, −60 and −50 dBc/Hz at 1 kHz offset. The simulated PTRS overhead conditions are no overhead, and a PTRS time density setting of 4, 2 and 1 (corresponding to 1 PTRS per 4 OFDM symbols, per 2 OFDM symbols and per OFDM symbol, respectively). An example PTRS mapping for density 2 is shown in FIG. 5. An OFDM symbol spans a multiple of resource blocks. Each resource block consists of 12 subcarriers. In the simulation results, a PTRS is added on a single subcarrier every 2 resource blocks (so every 24 subcarriers), per 4, 2 and 1 OFDM symbols, for PTRS density 4, 2 and 1, respectively. The invention is not limited to only varying the PTRS time density. Also the PTRS frequency density can be varied, meaning that a PTRS is included on more or less subcarriers. FIGS. 4a/b/c show that the more PTRS symbols, the better the FER performance is in severe phase noise conditions (due to improved phase tracking performance which can better track the present phase noise). With no (or few) PTRS symbols, error floors are observed in high phase noise conditions. On the other hand, optimal performance is achieved with no PTRS overhead for lower phase noise levels. Thus, the optimal amount of PTRS overhead depends on the amount of phase noise. The extra PTRS overhead in the OFDM grid decreases the effective FEC correction capabilities (in order to transmit the same payload in the same OFDM grid with more PTRS symbols, less redundant bits can be added increasing the FEC coding rate which reduces the FEC correction capabilities) explaining slightly lower performance for higher PTRS overheads in good phase noise conditions. This example again illustrates that performance can be optimised by optimal selection of the PTRS overhead as a function of the phase noise level.

The number of pilot symbols in a pilot group and the distribution of pilot groups can be chosen in several possible ways. In one paradigm very few pilot symbols are chosen, but the phase unwrapping of phase estimates need to consider many different pilot groups to average out over the noise. In another possible approach, a single pilot group is large enough to avoid phase ambiguities on the phase estimation (which can arise when the phase error is larger than $2\pi$ rad). For the latter case, a rule of thumb is that the correlation of a received pilot group with the transmitted pilot group results in a total SNR after correlation equal to 15 dB. Hence, if the communication channel SNR is higher than 15 dB, pilot groups can be as short as 1 symbol. If the communication channel SNR is higher than 12 dB but smaller than 15 dB, pilot groups can be as short as 2 symbols, and so on. For each pilot group (also referred to as pilot symbol sequence or pilot segment), a phase estimation is performed.

The matched filter block has two main tasks. Firstly, the input signal is matched filtered maximizing the signal-to-noise-ratio. Secondly, the output signal from the matched filter is resampled at the optimal symbol times (so minimizing the inter symbol interference as is well known in the art).

Finally, a phase tracker removes a remaining phase and frequency offset on the symbols. The symbols in the symbol segments are time aligned, but there can be a residual phase and frequency offset error. A scatter plot (i.e. a two-dimensional plot stacking the I and Q values of the symbols on the x and y dimension, respectively, on top of each other) shows points with a phase offset and slowly rotating. The goal of the phase tracker is to correct these residual phase and frequency errors, yielding a corrected version of the symbol segments, referred to as phase corrected symbol segments.

A phase offset is a static offset over time, while a frequency error results in a gradually increasing phase offset over time. The phase and frequency errors are initially estimated by the acquisition unit. However, further tracking is mandatory because of further phase drift during the burst due to acquisition unit imperfect estimations of the carrier frequency and due to so-called phase noise. This phase noise is not yet compensated for by the receiver front-end or by the initial acquisition. It is an aim of the method according to this invention to estimate the phase noise power and to distinguish it from the power of the remaining impairments. In broader sense the method of the invention is applied for estimating another characteristic than the power, for example standard deviation or a higher order moment. An accurate phase noise power estimate allows taking appropriate measures to prevent the phase noise from being a dominant performance degrading factor.

Most impairments (timing misalignment, insufficient adjacent carrier suppression, linear distortion) seen by the phase tracker can be approximated as additive and Gaussian distributed impairments. Hence, a signal quality estimator, e.g. an SNR estimation, on the signal before the phase tracker (here, on the input symbols) is in fact an estimation of the signal power versus the power of the approximately Gaussian distributed impairments. The reader skilled in the art knows the approximately Gaussian distributed impairment power is typically dominated by additive white Gaussian distributed thermal noise. The application field of the method and receiver device of the invention is therefore not limited to a scenario with only AWGN in strict sense. The received signal always contains some residual impairments other than thermal noise, the power of which is also part of the signal quality estimation on the input symbol sequence.

The carrier phase estimation can be data aided (based on the pilot symbols) or non-data aided (based on payload symbols). In both cases the measured phase errors are typically fed to a second order control loop to control the carrier phase. A second order loop can track both the phase error and the carrier frequency error. The phase tracker outputs phase corrected symbol segments. For tracking phase and frequency with zero residual phase error on an input with a frequency error, a second order loop is required. The transfer function of a second order loop is obtained with a first order integrator as loop filter.

Phase tracking is thus performed using a second order loop filter. At a certain moment in time, the phase correction is based on the current second order filter state. Each time a new phase estimation is available, the estimation error is fed to the loop and the loop state parameters (phase and frequency) are updated. An alternative approach would be to store the complete burst and then combine all the pilot symbol power for optimal phase and frequency estimation. The latter approach is more optimal in terms of estimation quality, but requires more buffering, causing system latency and does not allow for time-multiplexed demodulation. The method of this invention is not limited to a particular tracking approach.

The invention proposes in one aspect an approach for performing phase tracking whereby the need to estimate the phase noise power including the higher frequency components is addressed. The phase noise power estimation is then used to decide if and how at least one transmit parameter of the digital transmitter of the communication system is to be adjusted. In another aspect the invention relates to a receiver structure with optimized parameters. A receiver parameter optimization can be the tuning of the phase tracking loop bandwidth. Making the phase tracking loop faster allows coping with more phase noise at the cost of some estimator self-noise loss. Balancing the AWGN loss and the phase noise loss in the receiver will result in optimal performance for the given waveform. However, in a preferred embodiment of the method for adjusting one or more transmit parameters according to the invention, the waveform at the transmit side is optimized given the phase noise estimated, which is even better than receiver optimization, because the phase noise degradation that can result in poor error floor performance, can be avoided. Optimization at the receive side for given phase noise conditions is indeed possible but suboptimal, as it requires non-coherent detection resulting in a performance penalty. Error curves with a performance floor due to phase noise as shown in FIG. 4 do not allow tight ACM (adaptive coding and modulation) control.

Figure 6:
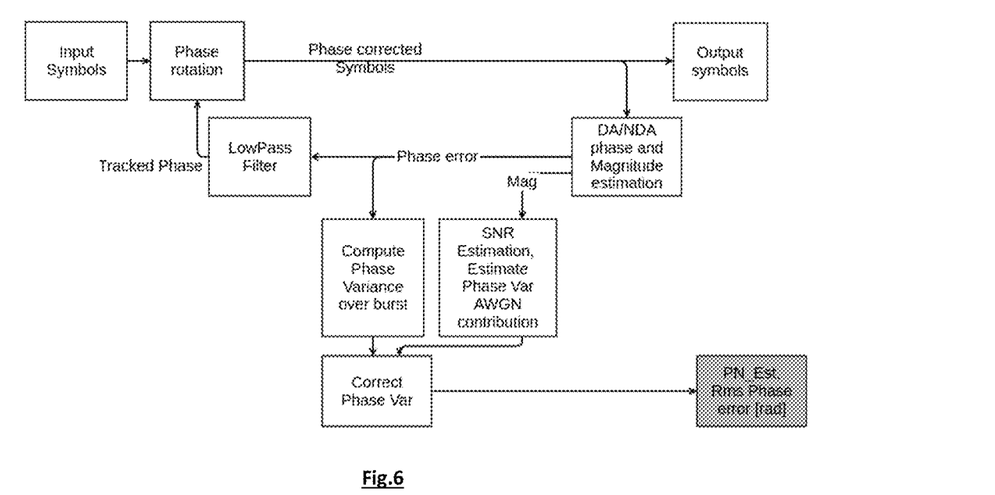
FIG. 6 illustrates an embodiment of the phase tracking proposed in this invention.

An embodiment of the proposed phase tracking is illustrated in FIG. 6. In the top part of the figure the scheme of FIG. 1 can easily be recognised. The phase estimator output is used to estimate the phase noise power, as will be detailed below. The method of the invention is however not limited to the embodiment depicted in FIG. 6.

In an embodiment of the invention the phase of a, possibly phase corrected, symbol sequence is estimated on pilot symbol sequences (i.e., in a DA mode). In another embodiment the method of the invention is applied when a Non Data Aided (NDA) mode is used on groups of symbols (i.e. symbol segments). In order to estimate the phase noise power, including high frequency components, the phase estimator output is so processed that it yields a phase noise power estimation. However, the phase estimates provided by the phase estimator are highly influenced by the additive white Gaussian noise (AWGN, such as thermal noise) present in the phase corrected symbol sequence. The present invention proposes to estimate the total phase error power, to estimate the AWGN contribution to the total phase error power and to subtract the latter from the former to yield the phase noise power. This phase noise power estimation can subsequently be used to check if an adjustment of one or more transmit parameters at the transmitter side is needed or not, and, if so, to determine the adjusted parameter(s). Transmit parameters that can be adjusted are for example, without being limited thereto, the known symbol composition (i.e. the number and location of pilot symbols sent) or the symbol rate of new bursts. In this way it can be ascertained that on the one hand the phase noise never dominates and remains negligible with respect to the thermal noise power or other impairments (such as distortion), and that on the other hand the waveform is efficient with a minimum number of known symbols (and keep the number low in case of low phase noise).

In an even more advanced scenario the exact adaptation of transmit waveform parameters like pilot distribution or symbol rate can be based on several receiver metrics, not limited only to the phase noise estimation. The definition of the optimal parameters can be the result of a machine learning algorithm. The input metrics for machine learning can for example include one or more of the following: estimated phase noise, estimated SNR, estimated carrier level, estimated distortion and FEC decoder metrics (such as error rate, corrected number of bits, number of failed parity check equations, etc.).

In some embodiments the contribution from the AWGN to the total phase error noise power is estimated using bounds on phase estimators accuracy. Obviously, the implemented phase estimator and SNR conditions must be such that the bound is a good prediction of the AWGN estimator contribution. In certain embodiments this bound may be the modified Modified Cramér Rao bound (MCRB). In other embodiments, the bound is the true CRB (see e.g. the paper '*The True Cramér-Rao Bound for Carrier and Symbol Synchronization*', N. Noels et al., Eusipco Conf. Proc., 2002). Also other theoretical bounds than the CRB bound can be used, as will readily be appreciated by the person skilled in the art. In yet other embodiments or in cases when no adequate prediction bound can be found, with either DA or NDA phase estimators, the phase error estimation from the AWGN contribution can be based on tabulated values obtained by means of simulations, as a function of SNR and applied modulation. Using these precomputed tabulated values is computationally more efficient and can more easily accommodate for non-linear functions between the thermal noise power and the thermal noise contribution to the phase noise estimator. For example, it was observed that the relation between the phase noise estimator and the thermal noise contribution is non-linear when the thermal noise power is high (thus, at low signal to noise ratio).

Each continuous or non-continuous waveform transmission comprises known symbol sequences (also called known symbol segments) and each known symbol sequence is composed of K symbols. For each known symbol sequence, a phase error is estimated and its power can be computed. Note that in the case of non-data aided phase tracking, phase estimation can be performed on segments of payload data symbols.

In preferred embodiments the receiver is a coherent receiver. Use of a coherent receiver is advantageous as differential detection may introduce more detection noise and result in poorer performance for a given link budget. For $s=\{s_k\}$ the received, optionally phase corrected, pilot symbol sequence with L pilot symbols (k=1, . . . , L) and $p_k$ the reference pilot symbols (i.e., the transmitted pilot symbols), the pilot symbol sequence phase error power of pilot symbol sequence i can be estimated via coherent detection $$Pil_i = \sum_{k=1}^{L} s_k \cdot conj(p_k)$$

whereby conj denotes the complex conjugate and L the number of pilot symbols per pilot symbol sequence. $Pil_i$ is the complex correlation result containing magnitude and phase information about pilot symbol sequence i. Note that this coherent detection also corresponds to maximum likelihood detection for the amplitude and the phase of the pilot symbol sequence.

The phase error is the difference between the received (and possibly phase corrected) symbols and the transmitted symbols. The phase error variance or total phase error power estimation over a single burst with N known symbol sequences can be computed as follows $$PhaseErrPower = \frac{\sum_{i}^{N} angle(Pil_i)^2}{N-1}$$

In case a NDA mode is applied, the quantity $Pil_i$ is estimated on segments of payload data symbols as detailed later in this description. The phase error power estimation is influenced by the phase noise, the phase tracking loop and thermal noise. The remaining frequency offset after the acquisition unit is typically completely tracked by the phase tracker. This frequency offset is typically negligible over a sequence of L symbols and is therefore tracked by considering multiple sequences of L symbols, which is done by the phase tracker. So, the phase variations observed on the (phase corrected) symbols are due to phase noise and due to the other remaining impairments, which comprise mainly additive white Gaussian thermal noise, some linear and non-linear distortion and some minor other impairments. The reader skilled in the art knows that those remaining impairments are predominantly circularly symmetric Gaussian distributed. This can be witnessed for example by looking at a scatter plot of the phase corrected symbols, which typically consists of circular symmetric clouds on top of the constellation points.

In the proposed approach a signal quality estimation is needed. An excellent candidate is the signal-to-noise ratio (SNR). There are several ways to obtain the SNR. The SNR can be available from other units in the demodulator chain like the acquisition unit operative in the demodulation process or from the forward error correction (FEC) decoding block. In the case of pilot based tracking the SNR level can also be derived from the pilot symbol level measurement.

Together with the phase detection of the known symbols, the useful signal RMS magnitude can be estimated from the coherent detection. The squared useful signal RMS magnitude can be compared to the total power and an SNR estimation can be derived.

The skilled person will readily recognise other SNR estimation methods can be applied as well. This invention is not limited to one SNR estimation method or, more in general, to a particular way of obtaining a signal quality indication. For example, any SNR estimator, e.g. using an FFT in the guard time or using decoder metrics (mapping for example the number of decoding iterations to an SNR estimate) can be used in this invention.

Signal quality estimation is a key feature of the solution presented in this invention as it is required for the compensation of the thermal noise contribution in the phase error power estimation.

The Cramer Rao Bound (CRB, also known as the 'standard' or 'true' CRB) is a fundamental lower bound on the variance of the estimation in any unbiased estimator. An unbiased estimator meets the requirement that the average of the estimation over all possible received signals, given the impairment, result in the actual average impairment value.

For a data aided phase estimation, the modified Cramér Rao Bound is proven to be a good prediction of the pilot segment phase error power estimate, see the paper 'Cramér-Rao Lower Bounds for QAM Phase and Frequency Estimation', F. Rice et al., IEEE Trans. Comm., Vol. 49, Issue 9, September 2001, pp. 1582-1591).

For high SNR (or for long pilot segments) the Cramér Rao bound is sufficiently accurate for prediction of the phase error power of a signal impaired only with additive white Gaussian noise. For signals impaired with phase noise and with additive white Gaussian noise, the Cramér Rao bound is a good prediction for the phase error power contribution from the white Gaussian noise to the total phase error power. For lower SNR conditions, the estimator quality can deviate from the Cramer Rao Bound and the phase error power contribution from white Gaussian noise (such as thermal noise) can be higher. In typical modern waveforms there are few pilot symbols and the white Gaussian noise contribution to the phase error power estimate can better be tabulated or approximated by fitted polynomials than just the CRB Bound.

As already mentioned, the invention is not limited to the use of only the SNR. Another signal quality estimation can also be used to tabulate the phase error power contributed by AWGN. For example, it can be shown that there is a one-to-one link between the corrected number of bits by the decoder and the SNR. Hence, the phase error power can also be tabulated with respect to the corrected number of bits. This can be done in an equivalent way by many other signal quality estimations.

In case a modified CRB is considered as an estimation of the AWGN contribution to the estimate phase noise power, the expected phase error power estimation in thermal noise conditions can be computed as follows:

$$PhaseAWGNVar = MCRB_\theta = \frac{1}{2L(SNR)}$$

with L the number of symbols in a group. As mentioned above, PhaseAWGNVar can also be computed using other bounds as a function of the SNR or via tabulated values obtained by means of simulations as a function of the SNR.

In the embodiment presented in FIG. 6, the phase noise is tracked using a second order loop. The tracking loop tries to follow the measured phase errors. Also the AWGN contributes to these variations. The following itself by the tracking loop creates even further phase variations, denoted by PhaseAWGNLoopVar. Assuming that PhaseAWGNLoopVar is Gaussian distributed and assuming a second order loop, the PhaseAWGNLoopVar can be estimated as $$PhaseAWGNLoopVar = PhaseAWGNVar * 2 * ENBW$$

where ENBW represents the loop filter equivalent noise bandwidth. The equivalent noise bandwidth is the bandwidth of an idealised perfect pass and perfect stop low pass filter that would pass the same noise power as the real filter. Optionally, the PhaseAWGNLoopVar contribution to phase error power can be tabulated in function of SNR and loop settings.

The final phase noise power estimate, denoted PNest, can then be computed by subtracting the contributions caused by AWGN noise, more specifically $$PN_{Est} = PhaseErrPower - PhaseAWGNVar - PhaseAWGNLoopVar$$

Figure 7:
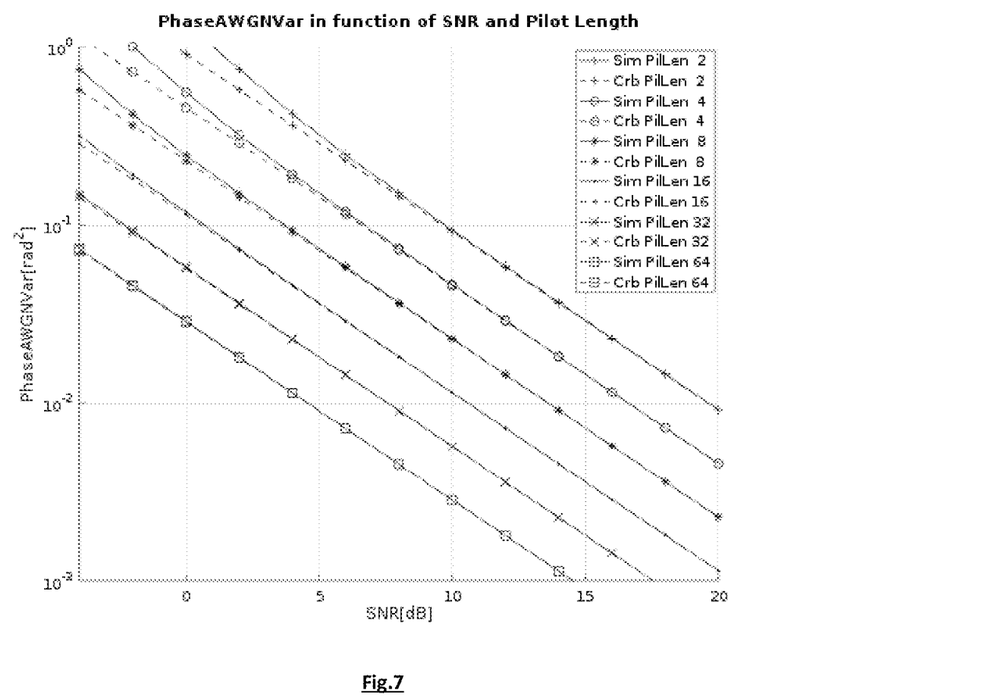
FIG. 7 illustrates the expected phase error power estimation as a function of the SNR for a number of different pilot segment lengths.

FIG. 7 shows PhaseAWGNVar as a function of the SNR for different pilot segment lengths (denoted by PilLen in the legend). FIG. 7 shows simulated results (denoted by Sim in the legend) and the Cramér Rao Bound (denoted by Crb in the legend). It can be seen that for low SNR or short pilot segments, the difference between CRB and the simulated result can be too high, requiring better approximations or tabulated corrections.

In the embodiments presented above the phase estimation is based on the DA pilot phase estimates. However, the estimation can be generalized to non-data aided (NDA) tracking. In the NDA case, the symbols are split into segments of payload data symbols on which a phase estimation can be performed. Just as with the pilot groups, the segments phase estimators variance can be compared to the expected variance in AWGN conditions in order to isolate the true phase noise contribution from the AWGN contribution.

A classical NDA phase estimation technique is the Viterbi-Viterbi algorithm. In this algorithm, the modulation ambiguity is removed by raising the signal to a power equal to the modulation ring multiplicity.

$$PhaseErr_{segi} = \text{angle}\left(\sum_{k=1}^{M} s_k^N\right) - phi_0 * N$$

where M denotes the segment length, N the outer ring multiplicity (i.e. 2 for BPSK, 4 for QPSK, 8 for 8PSK) and $phi_0$ the first constellation point phase offset. This phase error estimate on each segment i can be used instead of the angle(Pil_i) (for DA mode) in the equations above for estimating the total phase error power. The required number of symbols per segment M depends on the SNR and the modulation. The larger M, the better the estimation will be, but the longer the averaging period. This is similar to the pilot segment length compromise in data aided operation. In data aided mode the required pilot segment length also depends on the SNR.

Figure 8:
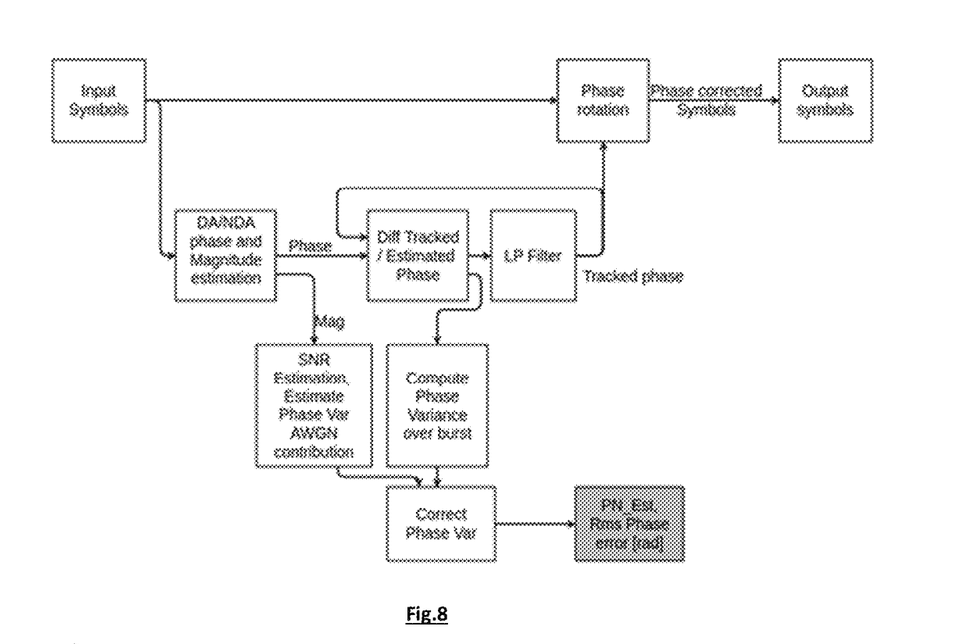
FIG. 8 illustrates an embodiment of the invention wherein phase estimation is performed on input data symbols.

In another embodiment a phase estimation can be performed on the input symbols instead of on the phase corrected symbols. The estimated phase is then no longer the phase error between tracked and received symbols but the received symbol phase. Carrier phase tracking and correction can still be performed, for example as shown in FIG. 8. This embodiment is interesting when phase measurements are available as side effect of another function in the demodulator (like the acquisition of the equalizer) or in a time multiplexed demodulator where the loop complexity should be minimised as it makes the state management more complicated.

In the above embodiments pilot symbols are typically known symbols taken from a N-QAM or N-APSK constellation. In another embodiment OFDM modulation can be used such as in 5G-NR. In OFDM modulation, DA or NDA phase measurements can also be performed on consecutive symbols or groups of symbols (not necessarily known symbols in the case of NDA). All the computations of PhaseErrPower, PhaseAWGNVar, PhaseAWGNLoop Var and PNest remain valid. The comparison to a reference phase noise mask also remains applicable.

In an OFDM transmission the transmit waveform adaptations can be the shape of the allocated transmission slot resource elements (REs) in a Time and Frequency OFDM grid. Packet transmissions using more subcarriers for less time is beneficial for phase noise robustness. However, this comes at the cost of a wider transmission bandwidth requiring a better link budget and causes more traffic jitter due to the non-continuous time transmission. An allocation with resource elements more spread in time is preferable for traffic jitter but is more prone to terminal frequency offsets and phase noise degradation. Another possible transmit side adaptation for the OFDM waveform is the distribution of the phase tracking reference symbols (PTRS symbols) on the OFDM grid. A higher phase noise requires more reference symbols for proper tracking of the phase in the receiver. Hence, in one embodiment, the distribution and the density of the PTRS symbols is optimized given the estimated phase noise according to the invention.

Figure 9:
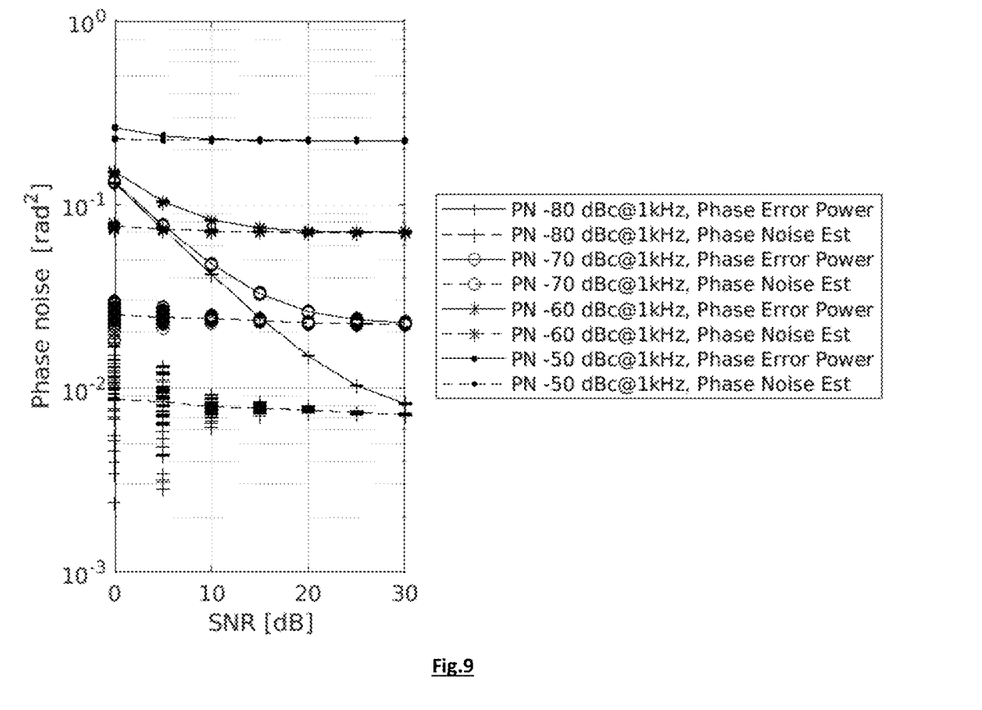
FIG. 9 illustrates the simulated Phase Noise power and Phase Noise estimates as a function of the SNR for different phase noise levels with profile $1/f^2$.

As an example embodiment, the phase noise detector was simulated for an OFDM waveform using the PTRS symbols for phase noise estimation. In this simulation, each estimation is based on 10000 5GNR slots corresponding to 10 second of OFDM waveform in numerology 0. FIG. 9 shows the Phase Noise Power and the Phase Noise estimation for $1/f^2$ phase noise profiles with a level of −80, −70, −60 and −50 dBc/Hz at 1 kHz offset from the central frequency. The figure has a logarithmic scale and shows the phase error power and the phase noise estimation. One can see how asymptotically the phase noise is dominant in the phase error power for high SNR while the AWGN contribution to phase error power is dominant for low SNR. The exact transition zone between high and low SNR depends on the phase noise. The simulation also shows that the estimation is most accurate for high SNR or high phase noise. One can see that the phase noise estimation is more noisy for low SNR combined with low phase noise. This is not critical as the performance degradation due to phase noise is highest for high SNR and high phase noise.

Figure 10:
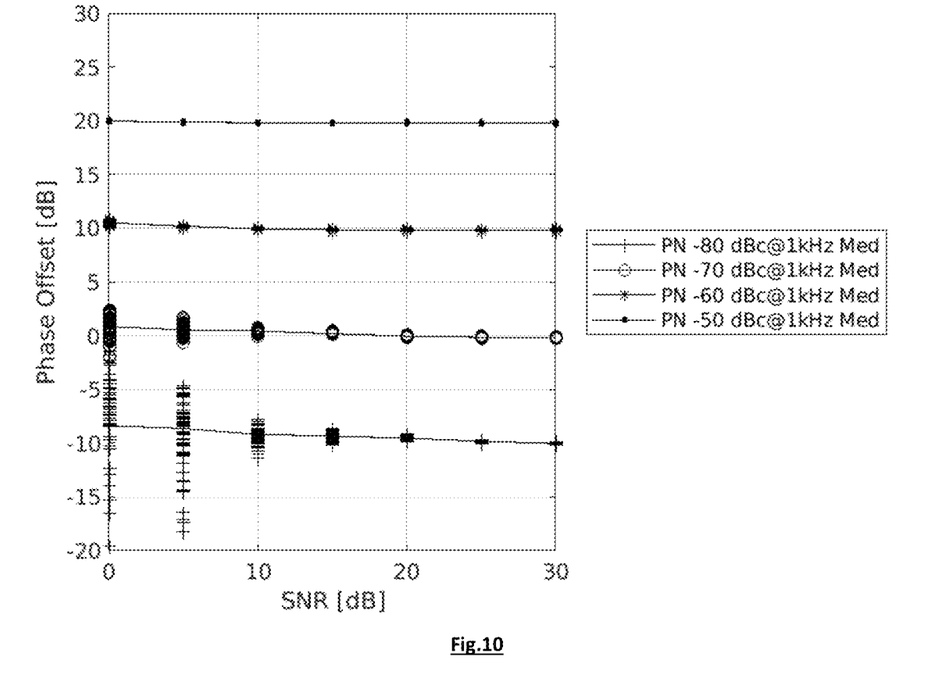
FIG. 10 illustrates the offset-to-reference mask estimations for a reference mask of −70 dBc/Hz@1 kHz with profile $1/f^2$.

There is no general rule as to which amount of phase noise power is harmful and which is not, as this depends on the modulation and coding used. Therefore, in some embodiments of the invention the phase noise is characterized with respect to a reference value. More specifically, for a given mask (specified by a given reference phase noise frequency power spectral density (PSD)), a reference phase noise estimation can be computed via the integration of this reference phase noise PSD. The so obtained value, denoted PNref, can be used as a reference for the estimate PNest defined above. The ratio (PNest/PNref) can be converted to dB, denoted by "offset from reference mask", for easier understanding of how well the received phase noise by a particular receiver complies with the reference mask. When this "offset from reference mask" is greater than 0 dB (or some other threshold) one operates with phase noise above the reference mask. This can be used to trigger a mitigation action like changing the symbol rate or changing the pilot distribution. When "offset from reference mask" is smaller than 0 dB, the phase noise is lower than the reference value. This concept is illustrated in FIG. 10. The offset to a $1/f^2$ reference mask of −70 dBc/Hz at 1 kHz is shown for the same results as shown in FIG. 9.

In some embodiments the method of estimating phase noise and deciding on transmit or receiver parameter adjustment as described may be implemented in software in the receiver structure. For example, the method of estimating phase noise can be implemented in an FPGA in the phase tracker. More specifically, Pil_i is computed in the FPGA, after which a processor reads those values and computes PhaseErrPower, PhaseAWGNVar, PhaseAWGNLoop Var and PNest. Alternatively, a received, optionally phase corrected, pilot symbol sequence s={$s_k$} is stored in a RAM, read by a processor and the entire computation is done in software or in a cloud based environment.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for estimating phase noise of a sequence of symbols received in a demodulator of a digital receiver, the method comprising:
   measuring a phase for the symbols of said sequence,
   deriving a total phase error for said sequence from said measured phases,
   determining a characteristic of said total phase error,
   deriving, based on a signal quality estimation of said received sequence of symbols, an indication of a contribution to said characteristic from at least one impairment different from phase noise,
   obtaining a phase noise estimation by subtracting said indication of said contribution from said characteristic of said total phase error,
   wherein said indication of said contribution to said characteristic is computed using a predetermined function.

2. The method for estimating phase noise as in claim 1, wherein said predetermined function is a lower bound for a variance of said received sequence of symbols.

3. The method for estimating phase noise as in claim 2, wherein the lower bound is a Cramér-Rao bound.

4. The method for estimating phase noise as in claim 1, wherein the predetermined function corresponds to tables of values obtained from simulations.

5. The method for estimating phase noise as in claim 1, wherein the signal quality estimation is a receiver signal to noise ratio estimation.

6. The method for estimating phase noise as in claim 1, wherein the digital receiver is a coherent receiver.

7. The method for estimating phase noise as in claim 1, wherein the characteristic of said total phase error is the power of the total phase error.

8. The method for estimating phase noise as in claim 1, wherein the symbols of said sequence are known symbols.

9. The method for estimating phase noise as in claim 1, wherein the obtained phase noise estimation is compared with a reference phase noise value.

10. The method for estimating phase noise as in claim 9, wherein the reference phase noise value is determined as a function of a reference phase noise power spectral density.

11. The method for estimating phase noise as in claim 9, wherein at least one transmit parameter is adjusted depending on the outcome of the comparing, said adjusting comprising at least, if the obtained phase noise estimation exceeds the reference phase noise value, increasing a symbol rate of the sequence of symbols or changing the sequence of symbols by inserting more known symbols at a digital transmitter side.

12. The method for estimating phase noise as in claim 9, wherein at least one transmit parameter is adjusted depending on the outcome of the comparing, said adjusting comprising, if the obtained phase noise estimation exceeds the reference phase noise value, changing a time and frequency resource elements allocation on an orthogonal frequency-division multiplexing (OFDM) grid.

13. The method for estimating phase noise as in claim 12, wherein the adjusting comprises increasing a density or changing a distribution of phase tracking reference symbols on said orthogonal frequency-division multiplexing (OFDM) grid.

14. The method for estimating phase noise as in claim 12, wherein the adjusting comprises increasing phase tracking reference symbol (PTRS) time or frequency densities on a 5G-NR channel.

15. The method for estimating phase noise as in claim 9, wherein at least one transmit parameter is adjusted depending on the outcome of the comparing, said adjusting comprising at least, if the obtained phase noise estimation is below the reference phase noise value, decreasing a symbol rate of the sequence of symbols or changing the sequence of symbols by using less known symbols in the sequence of symbols at a digital transmitter side.

16. The method for estimating phase noise as in claim 9, wherein at least one transmit parameter is adjusted depending on the outcome of the comparing, said adjusting comprising, if the obtained phase noise estimation is below the reference phase noise value, changing a time and frequency resource elements allocation on an OFDM grid.

17. The method for estimating phase noise as in claim 16, wherein the adjusting comprises reducing a density or changing a distribution of phase tracking reference symbols on said OFDM grid.

18. The method for estimating phase noise as in claim 16, wherein the adjusting comprises reducing phase tracking reference symbol (PTRS) time or frequency densities on a 5G-NR channel.

19. The method for estimating as in claim 1, wherein a digital transmitter is arranged to modulate the sequence of symbols according to a 5G-NR standard.

* * * * *

UNITED STATES PATENT AND TRADEMARK OFFICE
CERTIFICATE OF CORRECTION

Page 1 of 1

PATENT NO. : 12,368,460 B2
APPLICATION NO. : 18/566337
DATED : July 22, 2025
INVENTOR(S) : Philippe Delbeke It is certified that error appears in the above-identified patent and that said Letters Patent is hereby corrected as shown below:

On the Title Page

Change item (73) Assignee from "ST ENGINEERING INDIRECT (EUROPE) CY NV" to "ST ENGINEERING IDIRECT (EUROPE) CY NV."

Signed and Sealed this
Fourteenth Day of October, 2025

John A. Squires
*Director of the United States Patent and Trademark Office*